United States Patent [19]
Subisak et al.

[11] Patent Number: 5,588,742
[45] Date of Patent: Dec. 31, 1996

[54] INTERNALLY ILLUMINATED SIGN

[75] Inventors: Gregory J. Subisak, Gahanna, Ohio; Douglas S. Hammond, Vicksburg, Mich.

[73] Assignee: Holophone Corporation, Newark, Ohio

[21] Appl. No.: 267,970

[22] Filed: Jun. 29, 1994

Related U.S. Application Data

[60] Division of Ser. No. 961,262, Oct. 15, 1992, Pat. No. 5,355,291, which is a continuation-in-part of Ser. No. 646,917, Jan. 28, 1991, Pat. No. 5,188,453.

[51] Int. Cl.$^6$ ................................................. F21V 11/00
[52] U.S. Cl. .......................... 362/291; 362/342; 362/812; 40/572
[58] Field of Search ................................. 362/812, 290, 362/291, 342; 40/563, 572

[56] References Cited

U.S. PATENT DOCUMENTS

| | | | |
|---|---|---|---|
| 1,430,147 | 9/1922 | Beville | 40/572 X |
| 2,141,139 | 12/1938 | Howe et al. | 362/290 X |
| 3,409,347 | 3/1987 | Vogel | 350/242 |
| 4,561,203 | 12/1985 | MacDonald, Jr. et al. | 40/570 |
| 5,128,850 | 7/1992 | Juodvalkis | 362/812 X |

*Primary Examiner*—Stephen F. Husar
*Attorney, Agent, or Firm*—Brooks & Kushman P.C.

[57] ABSTRACT

An internally illuminated sign in which a luminaire mounted on the border or periphery of the sign uniformly illuminates the face and/or faces of the sign thereby eliminating any necessity for providing human access to the interior of the sign for maintenance and relamping.

8 Claims, 4 Drawing Sheets

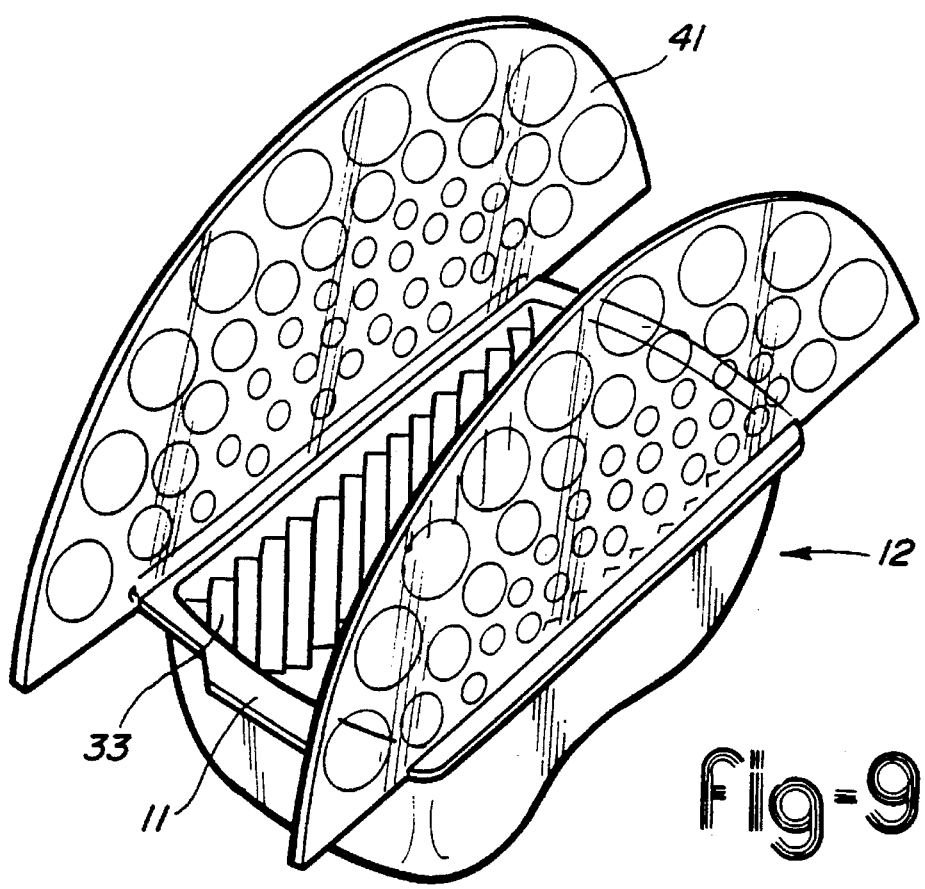
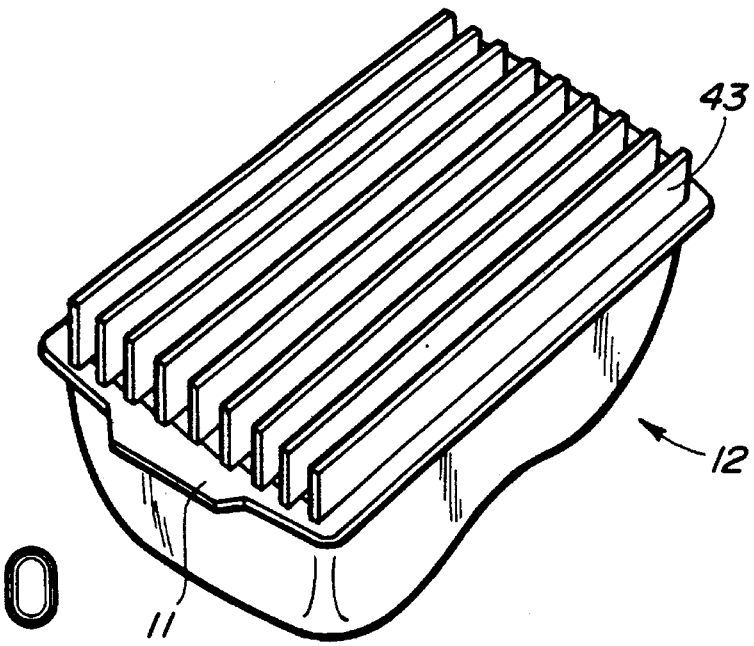

INTERNALLY ILLUMINATED SIGN

CROSS REFERENCE TO RELATED APPLICATIONS

This application is a divisional of Ser. No. 961,262 filed on Oct. 15, 1992, now U.S. Pat. No. 5,355,291, which is a Continuation-In-Part of U.S. patent application Ser. No. 646,917 filed on Jan. 28, 1991, now U.S. Pat. No. 5,188,453, by Holophane Company, Inc. The applications have, at all times relevant hereto, been commonly owned.

FIELD OF THE INVENTION

This invention relates generally to illuminated signs and more specifically to an illuminated sign having internal illumination.

BACKGROUND OF THE INVENTION

Internally illuminated signs have one or more translucent faces or message areas which are illuminated by lamps mounted inside the sign. While internally illuminated signs are often preferred over externally lighted signs, internally lighted signs of the prior art have been much more expensive to construct than externally lighted signs, especially when the sign is large. Internally illuminated signs are usually lighted with fluorescent lamps, although in some instances the light in internally illuminated signs is provided by mercury vapor or metal halide lamps. The translucent faces of the sign can be either rigid or flexible. Small rigid translucent faced internally illuminated signs often have hinged faces in order to provide access to the lamps for maintenance and relamping, whereas, large internally illuminated signs normally utilize flex faces and are built up to thirty-six inches deep to allow a person to enter the sign through the side and thereby provide access to the lamps for maintenance and relamping. In order to provide a sign having sufficient depth to allow human access, it is necessary for sign manufacturers to build a framework structure for the sign which adds significantly to the cost of the sign. In externally lighted signs, aluminum extrusions which are relatively inexpensive are often used as the outer framing. However, since aluminum extrusions have a practical cross-section limit of about fifteen inches, the depth of the large internally illuminated signs precludes sign manufacturers from using aluminum extrusions for the outside structure of the signs which require human access, thereby greatly increasing construction costs of internally illuminated signs of the prior art. In addition, in internally illuminated signs of the prior art, there has been difficulty in achieving the desired uniformity of luminance across the full area of the sign face, since there is a tendency for the portion of the face of the sign adjacent the lamp to be much brighter than the rest of the sign face.

BRIEF SUMMARY OF THE INVENTION

This invention relates to an internally illuminated sign in which the need for human access into the interior of the sign for maintenance and relamping is eliminated thereby eliminating the need for a deep sign and the higher costs associated with such sign construction. The present invention provides an internally illuminated sign in which a luminaire mounted on the border or periphery of the sign uniformly illuminates the faces of the sign. A significant feature of the present invention is uniformly illuminating the face or faces of the sign. As noted above, in internally illuminated signs of the prior art, there was a tendency for the portions of the sign face adjacent the lamps to be brighter than the rest of the sign face resulting in an uneven and undesirable distribution of light across the sign face.

The luminaire mounted on the border and internally illuminating the faces of the internally illuminated sign includes an aluminum reflector for distributing light in a fan-shaped pattern laterally along the sign and parallel to the sign faces, and a refractor which intercepts the light and directs the light to provide a uniform luminance on the sign faces while at the same time blocking direct source light from penetrating the sides of the refractor and producing a bright spot on a portion of the sign face adjacent the luminaire.

These and other features and aspects of the invention, as well as its various benefits, will be made more clear in the detailed description of the invention which follows.

BRIEF DESCRIPTION OF THE DRAWINGS

FIG. 9 is a perspective view of an alternative embodiment of the luminaires mounted on the border of the sign as pictured in FIG. 1, shown including vertically disposed and spatially separated perforated metal plates for use in reducing the brightness on the sign translucent faces on the luminaire; and FIG. 10 is a perspective view of an alternative embodiment of the luminaires mounted on the border of the sign as pictured in FIG. 1, shown including vertically disposed and spatially separated louvers for reducing "bright spots" on the sign translucent faces.

DESCRIPTION OF THE INVENTION

Figure 1:
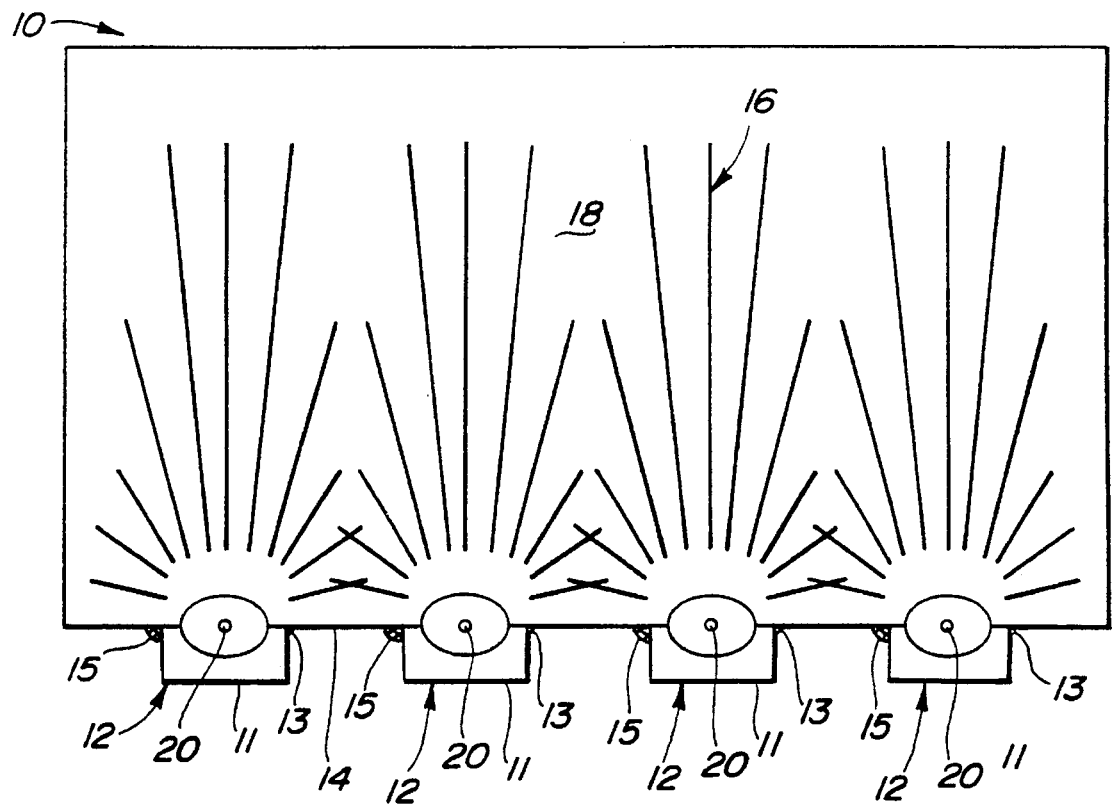
FIG. 1 is a sectional view showing the interior of an internally illuminated sign constructed in accordance with an embodiment of the present invention, in which a number of luminaires mounted on the border of the sign uniformly illuminate the faces of the sign.

Referring to FIG. 1, there is shown in an embodiment of the present invention a sectional view of the interior of an internally illuminated sign generally identified by the reference numeral 10 in which a number of luminaires 12 mounted at a lower periphery or border 14 of the sign 10 are adapted to provide a light distribution pattern generally identified by the reference numeral 16 to uniformly illuminate the faces 18 of the sign 10. Each of the luminaires 12 is mounted in such a manner that its lamp or light source 20 is positioned below the translucent faces 18 of the sign 10 and has an easily openable housing 11 which extends down below the sign 10. The housing 11 may be opened in any number of ways, for instance, it may be pivotally mounted about a hinge 13 and secured in a closed position by a latch 15, so that it may be opened to provide easy access to the interior of the luminaire for maintenance and relamping.

With the luminaires 12 mounted at the lower border 14 of the sign 10, the luminaires can be opened for maintenance and relamping without the need for a deep sign to provide human access. Since the present invention eliminates the necessity of having a deep sign, the translucent faces 18 of the sign 10 can be spaced less than 15 inches apart from one another and the outer structure of the sign can be made out of aluminum extrusion or other relatively inexpensive construction. While FIG. 1 illustrates the utilization of a number of luminaires, it should be apparent that the number of luminaires necessary is dependent on the size of the sign. Also, while in the embodiment of the invention illustrated in FIG. 1, the sign has two translucent faces the same principles of the present invention apply whether the sign has one or more translucent faces. Furthermore, while in the embodiment of the invention illustrated in the drawings, the luminaire is positioned at the bottom of the sign it is equally satisfactory to position the luminaires anywhere along the border of the sign such as at the top or the sides for instance.

Figure 2:
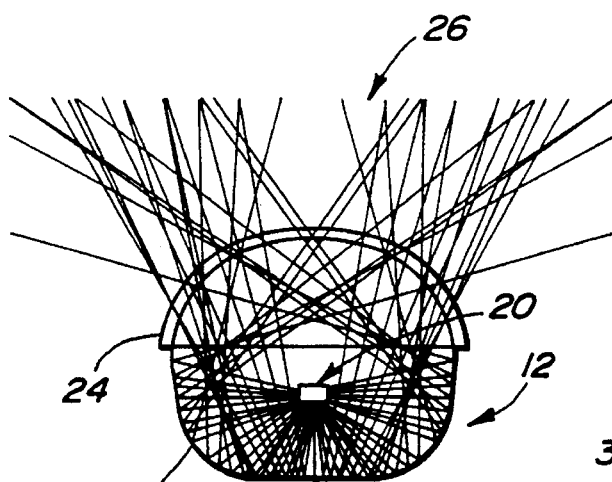
FIG. 2 is a frontal sectional view of the interior of one of the luminaires mounted on the border of the sign as pictured in FIG. 1, illustrating a luminaire reflector and the fan-shaped lateral distribution of light reflecting therefrom.

Referring to FIG. 2, there is shown a frontal sectional view of the interior of one of the luminaires 12 mounted on the border of the sign 10, having therein the lamp or light source 20, a reflector 22, made of aluminum or the like, positioned below the light source 20 and a refractor 24. As illustrated in FIG. 2, the reflector 22 is designed to reflect the light from the light source 20 in a fan-shaped pattern, generally identified by the reference numeral 26, laterally across a segment of the sign 10.

Figure 3:
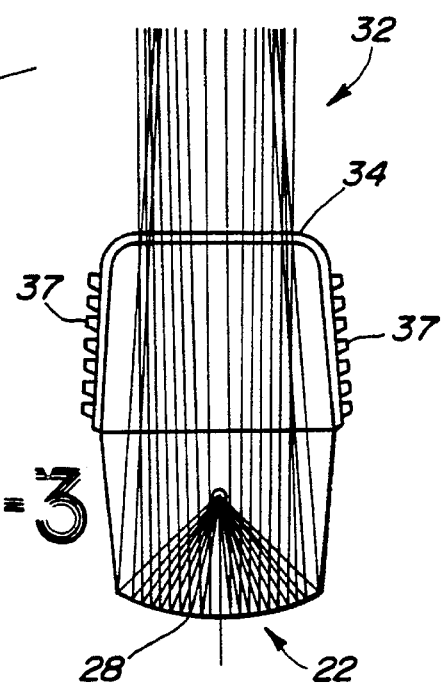
FIG. 3 is a side sectional view of the interior of one of the luminaires mounted on the border of the sign as pictured in FIG. 1 and FIG. 2, illustrating the parabolic contoured bottom of the luminaire reflector of FIG. 2 directing light rays straight up.

In FIG. 3 there is shown a side sectional view of the interior of the luminaire 12 of FIG. 2, illustrating the parabolic contoured bottom 28 of the reflector 22 reflecting light rays from the light source 20 up through the top 30 of the refractor 24 in a light distribution pattern generally identified by the reference numeral 32, parallel to the face 18 of the sign 10.

Figure 7:
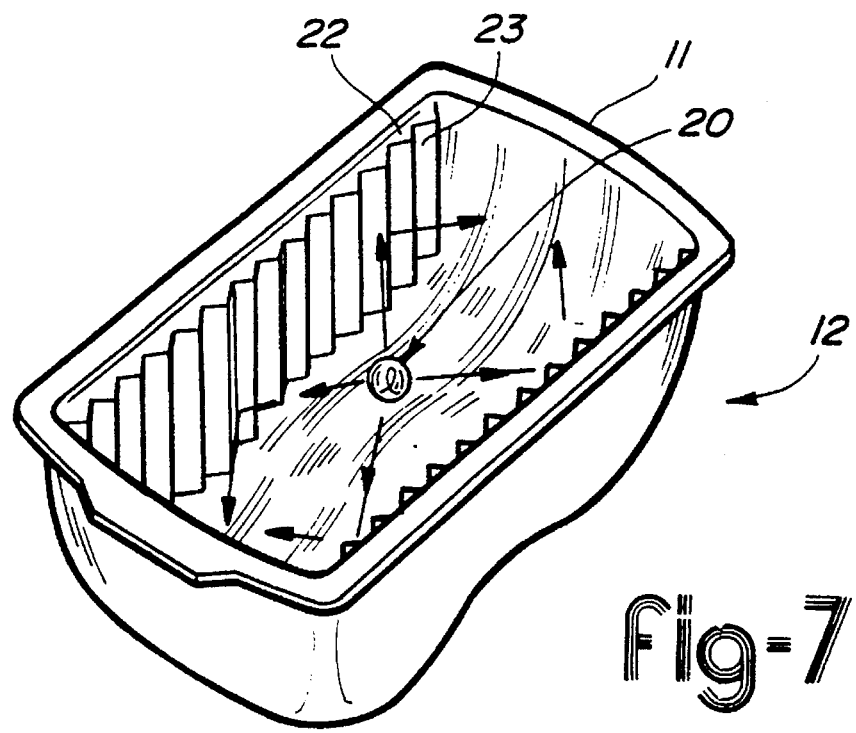
FIG. 7 is a perspective view of an alternative embodiment of the interior of the luminaires mounted on the border of the sign as pictured in FIG. 1, shown with the reflector having fluted sections vertically disposed in the luminaire housing to redirect light on the sign translucent faces.

With reference to FIG. 7, there is further shown an additional embodiment of reflector 22 having fluted sections 33 vertically disposed in housing 11 to redirect light and reduce the brightness of "hot spots" or "bright spots" on the sign translucent faces 18 near luminaires 12.

Figure 4:
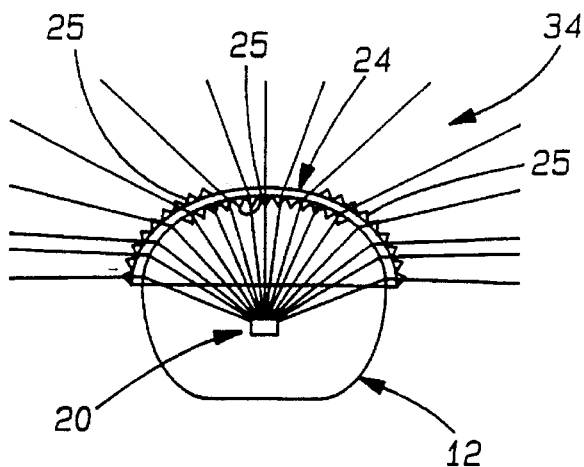
FIG. 4 is a frontal sectional view of the interior of one of the luminaires mounted on the border of the sign as pictured in FIG. 1, illustrating a luminaire refractor which through the use of prisms provides an even distribution of light onto the inside surfaces of the sign faces.

FIG. 4 is a frontal sectional view of the interior of the luminaire 12 in FIG. 2, illustrating the manner in which the refractor 24, by means of prisms as shown in FIG. 4, directs light from the light source 20 into a uniform pattern of light, generally identified by the reference numeral 34, onto the inside surfaces of the sign faces 18.

Referring now to FIG. 5, there is shown again the side sectional view of the interior of the luminaire 12 as pictured in FIG. 3, now illustrating a light pattern, generally identified by the reference numeral 36, formed by the action of horizontal reflecting prisms 37, as shown in FIGS. 3 and 5 on the outside surfaces of the sides 38 of the luminaire refractor 24 adjacent the translucent faces 18 of the sign 10 blocking and/or reflecting and redirecting most of the direct light from the light source 20 and minimizing light penetration through the sides 38 of the refractor 24 that would normally produce excessive luminance on the sign translucent faces 18.

Figure 5:
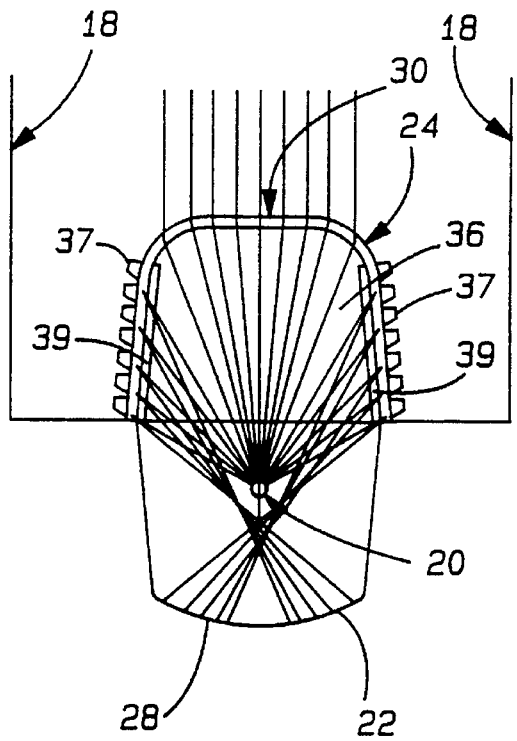
FIG. 5 is a side sectional view of the interior of the luminaire as pictured in FIG. 3, illustrating the action of horizontal reflecting prisms located on the outside surfaces of the sides of the luminaire refractor adjacent the faces of the sign blocking and reflecting most of the direct-light that would normally produce excessive luminance on the sign face.

All or a portion of these reflecting prisms 37 may be coated to assist in blocking and redirecting the light rays. Reflecting prisms 37 may be selectively coated with ceramic paints or other known heat-tolerant paints which can provide similar blocking performance. In the preferred embodiment, as shown in FIGS. 3–5, prisms 37 are selectively rear surface metalized via spraying or other known deposition techniques to obtain the required light blocking and/or light redirection. The coating process is applied to prisms 37 at a selected angle depending on the prismatic structure in order to partially coat the prisms. The uncoated areas of the prismatic structure allow light to penetrate and be refracted. The coated parts of the prismatic structure allow light to be redirected back to the reflector 22, allow light to be directed toward some other useful part of the luminaire 12 or allow light to be blocked.

Figure 8:
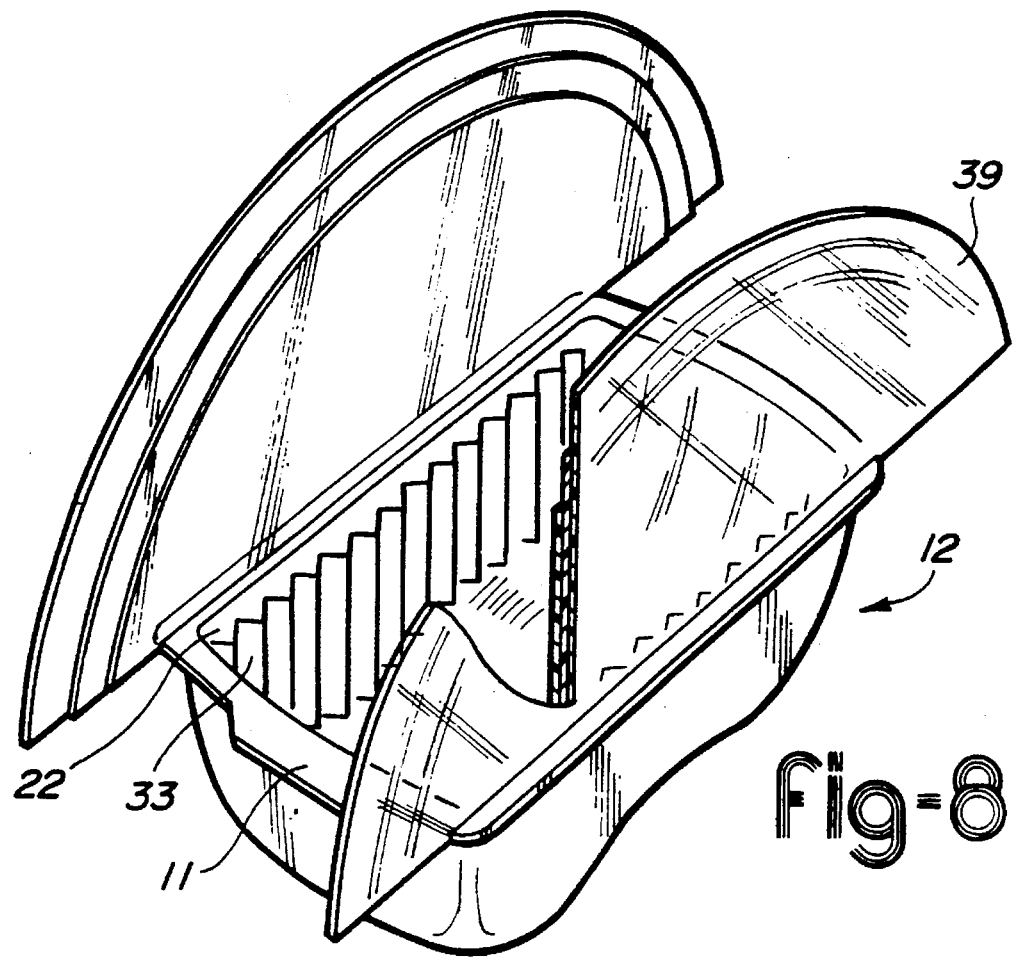
FIG. 8 is a perspective and partially fragmented view of an alternative embodiment of the luminaires mounted on the border of the sign as pictured in FIG. 1, shown including layers of adjustable translucent panels for obtaining the correct of light blockage.

In an alternative embodiment as shown in FIG. 8, layers of translucent material 39 such as white diffusing panels, for example, may be used to block light near the luminaire 12, thereby reducing the brightness of the sign. Layering the translucent material provides a means of adjusting the correct amount of light blockage. Those skilled in the art will thus recognize that multiple layers will block more light, where necessary.

In yet another alternative embodiment as shown in FIG. 9, vertically disposed and spacially separated perforated metal plates 41 may also be used to reduce the brightness on the sign translucent faces 18 near the luminaire. Still further, in yet another alternative embodiment as shown in FIG. 10, vertically disposed and spacially separated louvers 43 may also be used to reduce "bright spots" on sign translucent faces 18. Louvers 43 may also be coated preferably with a heat resistant material to improve their efficiency in blocking light.

Figure 6:
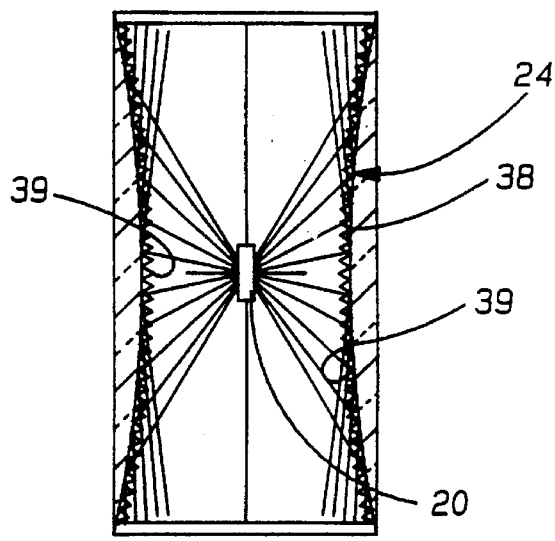
FIG. 6 is a top sectional view of the side sectional view of the interior of the luminaire pictured in FIG. 5, illustrating the light pattern resulting from the action of vertical biasing prisms located on the inside surface of the sides of the refractor.

Referring now to FIG. 6, which is a top sectional view of the side sectional view of the interior of the luminaire 12 pictured in FIG. 5, there is illustrated the action of vertical biasing prisms 33, as shown in FIG. 6, located on the inside surface of the sides 38 of the refractor 24 to reduce penetration of light through the refractor sides 38 and redirect light from the light source 20 laterally along the translucent faces 18 of the sign 10.

The action of the vertical biasing prisms located on the inside surface of the sides 38 of the refractor 24 cooperate with the horizontal reflecting prisms 37 on the outside surfaces of luminaire refractor 24 to effectively avoid the appearance of a bright spot on the portion of the sign translucent face 18 adjacent the light source 20.

The horizontal reflecting prisms 37 on the outside of the sides 38 of the refractor 24 are positioned so their axes are coincident with the light rays inside the glass. Since there is normally some rounding on each peak and valley of the prisms 37, this rounding will allow light to go directly through and cause brightness on the face of the sign were it not for the action of the vertical biasing prisms 39. Since each peak and valley of the vertical biasing prisms 39 will also be rounded and to illustrate the point, assuming for example, the rounding of each prism to be approximately 10%, the inside vertical prisms coupled with the outside horizontal prisms will reduce the amount of the light going directly through the refractor to 10% times 10% or 1%.

Another function of the internal biasing prisms 39 is to allow as much greater acceptance angle for the outside reflecting prisms 37. With light going directly into a reflecting prism, there is only a range of +/−3 degrees for total internal reflection. If the source is larger than this +/−3 degrees, than the prism will start to "leak." Accordingly, with the action of the internal vertical biasing prisms 39 biasing the light in a direction parallel to the reflecting prism path 37, the angle of the light with respect to the normal of the reflecting surface becomes much greater and therefore total reflection occurs from a much larger source.

From the foregoing, it can be seen that there has been provided by the subject invention a new and improved internally illuminated sign in which a luminaire mounted at the lower border or periphery of a sign utilizes a reflector to distribute light in a fan-shaped pattern laterally along the sign and parallel to the face of the sign, and a refractor to intercept light and redirect it to provide a uniform luminance on the sign face while at the same time blocking direct source light from penetrating the sides of the refractor and producing hot spots on the sign face.

It should be obvious that although a preferred embodiment of the invention has been described, it is possible to make changes to certain specific details of the assembly without departing from the spirit and scope of the invention.

What is claimed is:

1. In a sign having at least two spatially separated faces adapted to be illuminated from light radiated into the interior of said sign between said spatially separated faces, said at least two spatially separated faces including at least one translucent face, the improvement comprising:

a luminaire mountable on the periphery of said sign having means for providing light in the region between said spatially separated faces, means for eliminating bright spots on said at least one translucent face adjacent said luminaire, said elimination means comprising a plurality of spatially separated painted louvers, and means for disbursing light in the interior of said sign between said spatially separated faces to uniformly illuminate at least one translucent face.

2. In a sign having at least two spatially separated faces adapted to be illuminated from light radiated into the interior of said sign between said spatially separated faces, said at least two spatially separated faces including at least one translucent face, the improvement comprising:

a luminaire mountable on the periphery of said sign having means for providing light in the region between said spatially separated faces, means for eliminating bright spots on said at least one translucent face adjacent said luminaire, said elimination means comprising a plurality of spatially separated color-coated louvers, and means for disbursing light in the interior of said sign between said spatially separated faces to uniformly illuminate at least one translucent face.

3. In a sign having at least two spatially separated faces adapted to be illuminated from light radiated into the interior of said sign between said spatially separated faces, said at least two spatially separated faces including at least one translucent face, the improvement comprising:

a luminaire mountable on the periphery of said sign having means for providing light in the region between said spatially separated faces, means for eliminating bright spots on said at least one translucent face adjacent said luminaire, said elimination means comprising a plurality of spatially separated metalized louvers, and means for disbursing light in the interior of said sign between said spatially separated faces to uniformly illuminate at least one translucent face.

4. In a sign having at least two spatially separated faces adapted to be illuminated from light radiated into the interior of said sign between said spatially separated faces, said at least two spatially separated faces including at least one translucent face, the improvement comprising:

a luminaire mountable on the periphery of said sign having means for providing light in the region between said spatially separated faces, means for eliminating bright spots on said at least one translucent face adjacent said luminaire, said elimination means comprising at least one louvre, and means for disbursing light in the interior of said sign between said spatially separated faces to uniformly illuminate at least one translucent face, said disbursing means comprising a refractor having a plurality of horizontal reflecting prisms, each of said prisms having a top face, a front face and a bottom face.

5. A luminaire as in claim 4 wherein at least a portion of selected reflecting prisms are coated to achieve the desired light-blocking effect.

6. A luminaire as in claim 5 wherein said selected reflecting prisms are coated on their respective front and bottom faces.

7. A luminaire as in claim 5 wherein said selected reflecting prisms are coated with a heat-tolerant paint.

8. A luminaire as in claim 4 wherein selected reflecting prisms are rear surface metalized.

* * * * *

UNITED STATES PATENT AND TRADEMARK OFFICE
CERTIFICATE OF CORRECTION

PATENT NO. : 5,588,742
DATED : December 31, 1996
INVENTOR(S) : Gregory Subisak et al.

It is certified that error appears in the above-identified patent and that said Letters Patent is hereby corrected as shown below:

Col. 2, line 45, replace "direct-light" with --direct light--

Col. 2, line 63, after "correct", insert --amount --

Col. 5, line 52, replace "disbursing" with --dispersing--

Col. 6, line 10, replace "disbursing" with --dispersing--

Col. 6, line 25, replace "disbursing" with --dispersing--

Col. 6, line 38, replace "disbursing" with --dispersing--

Col. 6, line 41, replace "disbursing" with --dispersing--

Signed and Sealed this

Eighth Day of July, 1997

Attest:

Attesting Officer

BRUCE LEHMAN

Commissioner of Patents and Trademarks